(No Model.) 2 Sheets—Sheet 1.

M. BECK.
HAY LOADER.

No. 361,118. Patented Apr. 12, 1887.

Witnesses.
Will R Omohundro.
W. W. Elliott

Inventor.
Marshall Beck
By Jno. G. Elliott
Atty.

(No Model.) 2 Sheets—Sheet 2.

M. BECK.
HAY LOADER.

No. 361,118. Patented Apr. 12, 1887.

Witnesses. Inventor.
Marshall Beck,
By Jno. G. Elliott,
Atty.

UNITED STATES PATENT OFFICE.

MARSHALL BECK, OF CHICAGO, ILLINOIS, ASSIGNOR TO THE BECK & HOPKINS MANUFACTURING COMPANY, OF SAME PLACE.

HAY-LOADER.

SPECIFICATION forming part of Letters Patent No. 361,118, dated April 12, 1887.

Application filed October 13, 1885. Serial No. 179,752. (No model.)

*To all whom it may concern:*

Be it known that I, MARSHALL BECK, a citizen of the United States, residing in Chicago, county of Cook, and State of Illinois, have invented certain new and useful Improvements in Hay-Loaders, of which the following is a specification.

This invention relates to improvements in hay-loaders in which a single and pivoted rake at the rear end of the loader delivers the hay from the ground to elevators, which discharge the hay upon the wagon to be loaded.

The prime object of this invention is to obviate the necessity of taking up the hay in a web from the ground and to combine with the hay-loader a supplemental rake which can at intervals be actuated, either by hand or automatically, to dump its accumulations, so that they will be delivered in distinct parcels to the delivery-rake and elevator of the hay-loader, whereby the hay is raised out of the stubble immediately before its contact with the elevating-rakes and delivered to said rakes and the elevator without any liability of clogging and stopping the operation of the machine, whether the hay be more or less damp or in a perfectly dry state.

A further object of this invention is to simplify and reduce the number of parts in such a machine and to dispense with the necessity of a pawl-and-ratchet mechanism between the pair of sprocket-wheels for automatically engaging or disengaging said wheels when the machine is moving on a curve, as hereinafter set forth; and, finally, to provide certain details of construction, hereinafter described, and shown in the accompanying drawings, in which—

Figure 1:
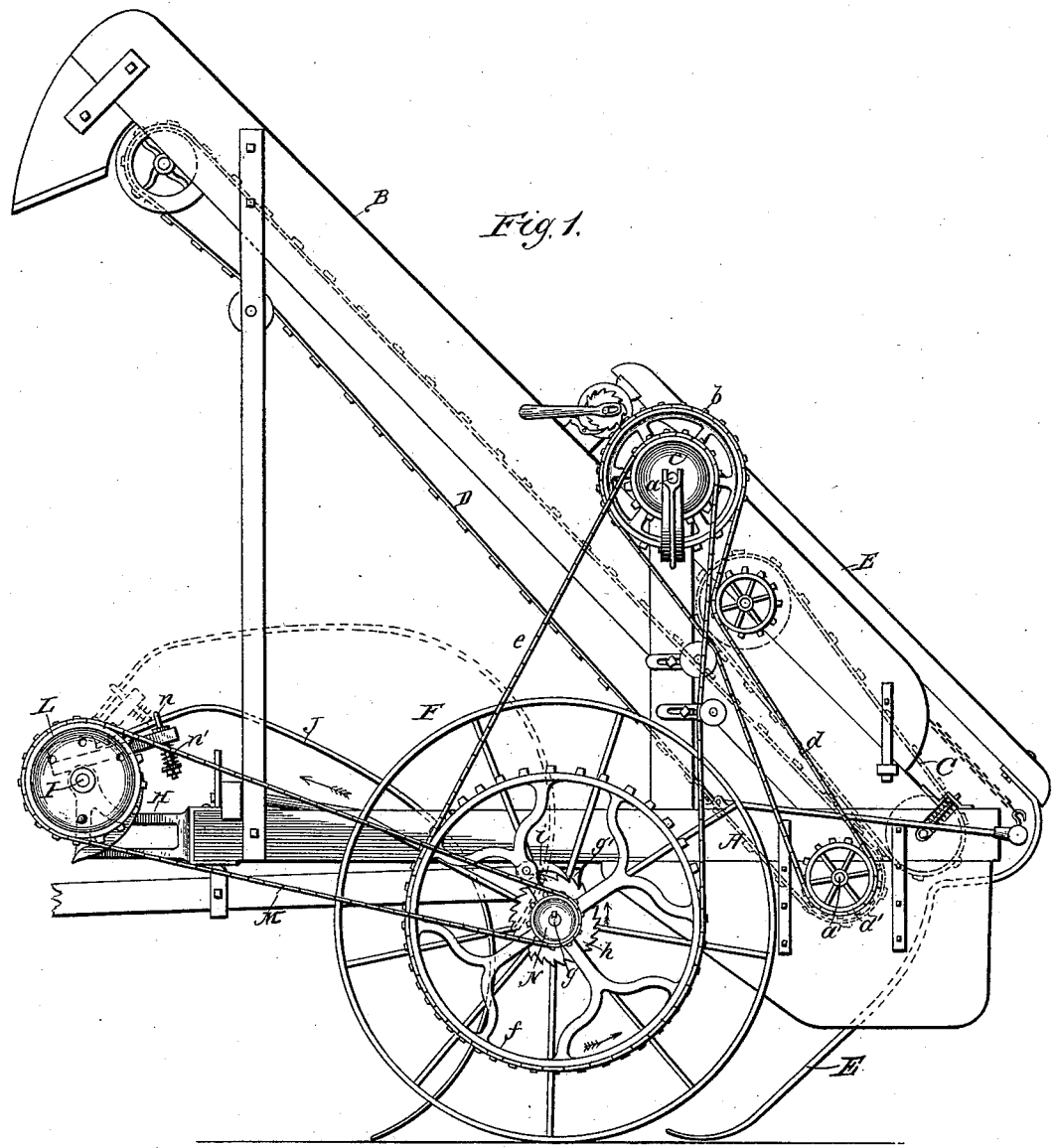
Figure 2:
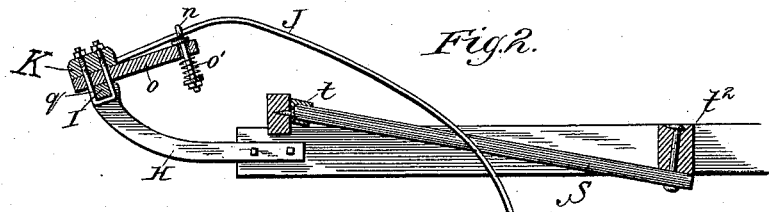
Figure 3:
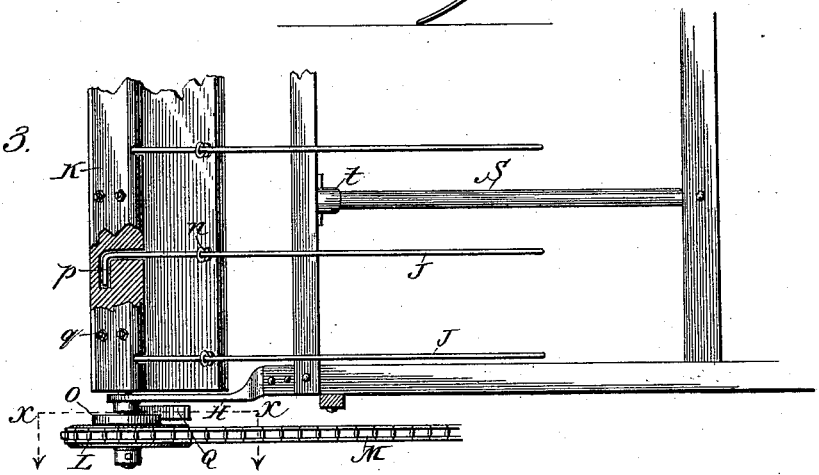
Figure 4:
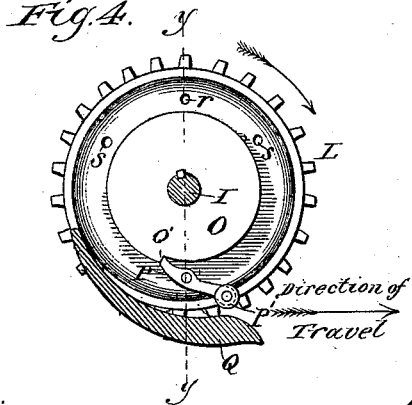
Figure 5:
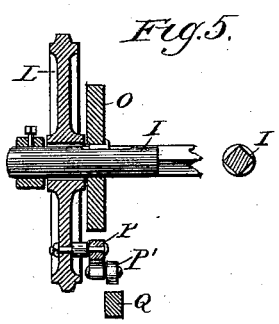

Figure 1 illustrates a side elevation of a hay-loader embodying my invention; Fig. 2, a detail transverse section through the dumping-rake and its support; Fig. 3, a detail top plan view of the dumping-rake, its support, and actuating mechanism; Fig. 4, a detail section on the line X X, Fig. 3, looking in the direction of the arrows; Fig. 5, a detail section on the line Y Y of Fig. 4.

Similar letters of reference indicate the same parts in the several figures of the drawings.

The base or side sills, A, the elevating-frame B, the upper and lower elevating-aprons, C D, respectively, and the delivery-rake E are of precisely the same construction and arrangement as set forth in another application filed by me.

On one end of the short shaft *a* are rigidly or loosely secured, as the case may be, two sprocket-wheels, *b c*, which, if desired, may be cast together, the former of which wheels is, by sprocket-chain *d*, connected with the driving-shafts of both the upper and lower carriers. The sprocket-wheel *c*, by chain *e*, is connected with a large driving sprocket-wheel, *f*, fixed on a shaft or axle, *g*, journaled in suitable hangers, *g'*, secured to the side sills, A, of the frame, on which axles the ground-wheels F of the frame are sleeved and revolve.

Fixed on one of the ground-wheels F, or on the hub thereof, is a toothed wheel, *h*, the teeth of which are engaged by a pawl, *i*, pivoted on the driving sprocket-wheel *f* and engaging the toothed wheel in such a manner that when the ground-wheel is revolved in a forward direction it will actuate the driving sprocket-wheel in the same direction, thereby transmitting power to the driving-shaft *a*, and thence to both carriers. However, when in turning a corner the ground-wheel is at a standstill, or has its direction reversed, the toothed wheel will not be actuated in the one case, and in the other the pawl will simply slip over the teeth thereof. While the pawl is shown attached to the driving sprocket-wheel and the toothed wheel to the ground-wheel, this mode of attachment may be reversed.

By the connection of the ground-wheel with its axle, as described, the carriers are actuated at a uniform speed when the machine is moving forward on a curve, because the ground-wheel on the inside of the curve will be at substantially a standstill or else backing while the other ground-wheel is moving forward. Under these conditions the pawl at the outer side of the curve will engage and actuate both toothed wheels because of their rigid attachment to the axle, while the axle at the same time is free to revolve in the hub of the ground-wheel at the inside of the curve, and hence if the driving sprocket-wheel is on the inside of the curve it will be revolved, while the adjacent ground-wheel is at a standstill, or possibly backing. A uniform velocity of the carriers is not only thus maintained when turning the machine, but also when, for any reason, one of the ground-wheels is suddenly checked or stopped by reason of its engaging a stump, lump, or depression in the ground or other obstruction, in which case the checking of the ground-wheel on the opposite side will be so gradual, when for any of these causes the machine is finally stopped, that the mechanism of the machine will not be injured or strained, as would be the case if more suddenly brought to a standstill.

On the forward ends of the sills are secured brackets H, which constitute bearings for a shaft, I, of a dumping-rake, J, the teeth of which (see Fig. 2) are composed of spring metal and have their shanks extending through eyebolts n, passing loosely through a head-board, o, and having confined between their lower ends and said board springs o', which yield against strain tending to elevate the rake-teeth, and, while permitting the rake-teeth when lowered to yield more than they normally would, serve to automatically depress the rake-teeth when the strain upon them is removed, and to relieve the teeth from strains which might otherwise injure them. The extremities of the shanks of the teeth are bent and fit in corresponding grooves, p, formed on the under side of a bar, K, between which and the head-board said shanks are confined and clamped by U-shaped bolts q, which embrace squared portions of the shaft I and clamp the rake-head rigid to said shaft, which is free to oscillate in the brackets H. The purpose of this rake is to lift the hay out of the stubble and gather it immediately in advance of the delivery-rake of the loader, and to this end, so far as the combining of a dump or supplemental rake with a hay-loader entirely forward of the delivery-rake is concerned, and which, broadly, I now believe to be new, it is immaterial whether said rake is operated automatically or by hand to dump its accumulated load in parcels at the proper time for the successful operation of the delivery-rake. In practice, however, it is preferred to connect said dumping-rake with the actuating mechanism of the loader in such a manner that said rake will at suitable intervals automatically dump its load immediately in advance of the delivery-rake. To this end a sprocket-wheel, L, loose on an outer and projecting end of the shaft I, is connected by a chain, M, with a sprocket-wheel, N, rigid on the axle g of the loader.
Rigidly keyed on the shaft I, next and on the inner side of the loose sprocket-wheel, is a disk, O, notched in one side only, to form a shoulder, O', for the engagement of a pawl, P, pivoted to the loose sprocket-wheel, and weighted at its outer end, where it is also provided with an anti-friction roller adapted to engage at intervals a camway, Q, secured to the arm H, and by so doing disengage the pawl from the shoulder of the disk.

During the forward movement of the loader the sprocket-wheel L is continuously revolved, and carrying with it the pawl, which, owing to its weighted end, is maintained in contact with the notched disk, so that during every revolution of the sprocket-wheel the pawl engages the notched wheel, and the result is, that the dumping-rake is lifted above, and, releasing its hold upon, dumps its accumulated load immediately in advance of the following and delivery rake.

The dumping-rake begins to rise the moment the pawl engages the notch in the disk, and continues to rise until the roller passes to the upper end of the camway, at which moment the camway, by its engagement with the roller, forces the pawl out of the notch, when the rake descends to its operative position, and in doing so returns the notch to its first position, where it is again engaged by the pawl during its revolution with the sprocket-wheel.

A single pawl operates to cause the rake to dump its load once during a complete revolution of the sprocket-wheel; but when desirable to dump the rake every half-revolution of said wheel another pawl is pivoted in the perforation r, Fig. 4, diametrically opposite the pivot of the pawl shown, and if three times during said revolution two additional pawls are pivoted in the perforations s s, which, with the pivot of the pawl shown, are at the three corners of a right-angle triangle.

In the rear of the head of the dumping-rake and on the loader-frame are a series of parallel rods or bars, S, (see Figs. 2 and 3,) which, when the dumping-rake is elevated to dump its load, operate as strippers and disengage any hay which may cling to the rake-teeth. These stripper-bars may be conveniently attached by inserting one end of each in a socket-piece, t, screwed in a cross-bar, t', and bolting the other end to a cross-bar, t², of the main frame of the loader.

In order to fully understand the advantages following the use of a dumping-rake in a hay-loader, it should be borne in mind that in cutting hay the adjacent and cut swath is forced into the stubble and depressions in the ground by the wheels and horses of the mower, and that the cut and spread-out hay while being cured is subject to heavy dews and rains, tending to settle it in the stubble and mat the hay, which settling and matting of the hay is not only further promoted by the passage over it of the horses and wagon preceding the hay-loader, but locked in the stubble by and during the advance of the horses and wagon, which bend the stubble over so much of the hay as is below the top ends of the stubble. With the hay so settled in the stubble and ground-depressions, and whether or not locked by the stubble, the delivery-rake penetrates instead of lifting it in advance of the matted mass, and as a result the teeth of the rake become clogged and gorged, so that, instead of the hay passing freely up the teeth to the carriers during the advance of the machine, the hay accumulates and is pushed forward by and piled up in front of the delivery-rake in such a manner that no hay can reach the carriers, and hence the machine must be stopped, the pile of hay removed from under the machine, and the teeth of the delivery-rake stripped, and this detrimental accumulation of the hay is promoted by the natural tendency of the hay to roll by the pushing action of the delivery-rake from the first moment it becomes clogged.

By the employment of the dumping-rake all of these objections are not only avoided, but their liability to occur is absolutely prevented, because the dumping-rake not only lifts the hay entirely out of the stubble and depressions in the ground and loosens up the matted mass, so that it may freely pass up the teeth of the delivery-rake to the carriers, which teeth are in the nature of fixed guides for the hay, but the hay so lifted and loosened by the dumping-rake is deposited in piles and taken up as soon as formed, and before the hay can settle from any cause, by the delivery-rake, which in its passage from one pile to another not only gathers loose hay over which the dumping-rake has passed, but by the action of the stubble has its points stripped of any hay tending to hang to and clog them.

It may also be observed that by bunching or piling the hay immediately in advance of the delivery-rake a material portion of it will be engaged and taken up by the carriers without having first to traverse the entire length of the teeth of the delivery-rake, and by these means the delivery-rake is relieved from much work which tends to cause the hay to adhere to and clog thereon, and, besides, the engagement of the carriers with the hay, as described, and by reason of its being piled, gives them a firm hold thereon and promotes their effectiveness in drawing the hay up the delivery-teeth. Another advantage in thus bunching the hay is, that it is delivered in more or less defined bunches to and in turn delivered by the carriers upon the wagon, and as a result its tendency to be scattered by the wind is materially reduced and approximately overcome, and, besides, the hay, being delivered in parcels to the wagon, is more conveniently distributed thereon.

Having described my invention, what I claim, and desire to secure by Letters Patent, is—

1. In a hay-loader, the frame, the elevator, and the delivery-rake, in combination with a dumping-rake and a pivotal support therefor, said dumping-rake located at a point entirely forward of the delivery-rake, whereby the hay is collected in separate parcels in the path of the delivery-rake, substantially as described.

2. In a hay-loader, a delivery-rake and an elevator, in combination with a dumping-rake and mechanism for automatically actuating said dumping-rake to dump at intervals its accumulated load, substantially as described.

3. In a hay-loader, the frame, the delivery-rake, the elevator, the dumping-rake, a pivot-connection between said frame and dumping-rake, and a ground-wheel, in combination with mechanism connecting said dumping-rake and wheel, whereby power is transmitted to and the dumping-rake is automatically actuated at intervals to dump its accumulated load and then assume its operative position for gathering the hay, substantially as described.

4. In a hay-loader, the frame, the dumping-rake pivotally connected therewith, and the delivery-rake rearward of the dumping-rake, in combination with the elevator, the mechanism for actuating the same and the dumping-rake, substantially as described.

5. The main frame, the ground-wheels thereof, the dumping-rake, and the shaft-connection between said rake and frame, in combination with a loose sprocket-wheel on said shaft, a belt-connection between said sprocket-wheel and ground-wheels, a notched disk fixed on said shaft, a pawl pivoted on the sprocket-wheel, and means for automatically engaging said pawl with the notched disk, whereby the rake is elevated at intervals, substantially as described.

In testimony whereof I have hereunto set my hand, this 7th day of October, 1885, at Chicago, Illinois.

MARSHALL BECK.

Witnesses:
W. W. ELLIOTT,
R. C. OMOHUNDRO.